(12) United States Patent
Tan

(10) Patent No.: US 9,248,819 B1
(45) Date of Patent: Feb. 2, 2016

(54) METHOD OF CUSTOMIZING VEHICLE CONTROL SYSTEM

(71) Applicant: Nissan North America, Inc., Franklin, TN (US)

(72) Inventor: Adrian Tan, Northville, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/526,021

(22) Filed: Oct. 28, 2014

(51) Int. Cl.
*B60T 17/18* (2006.01)
*B62D 15/00* (2006.01)
*B60W 40/06* (2012.01)

(52) U.S. Cl.
CPC ............... *B60T 17/18* (2013.01); *B60W 40/06* (2013.01); *B62D 15/00* (2013.01)

(58) Field of Classification Search
CPC combination set(s) only.
See application file for complete search history.

(56) References Cited

U.S. PATENT DOCUMENTS

| | | | |
|---|---|---|---|
| 6,338,015 B1 | 1/2002 | Kawagoe et al. | |
| 6,623,118 B2 | 9/2003 | De La Rosa | |
| 6,892,120 B2 | 5/2005 | Kanda | |
| 7,537,522 B2 | 5/2009 | Plavetich et al. | |
| 8,511,420 B2 | 8/2013 | Kojo et al. | |
| 2003/0060937 A1 | 3/2003 | Shinada et al. | |
| 2004/0266526 A1 | 12/2004 | Herbrich et al. | |
| 2007/0066916 A1 | 3/2007 | Lemos | |
| 2009/0312998 A1 | 12/2009 | Berckmans et al. | |
| 2010/0152951 A1* | 6/2010 | Chin et al. | 701/29 |
| 2011/0160964 A1* | 6/2011 | Obradovich | 701/41 |
| 2011/0224876 A1 | 9/2011 | Paholics et al. | |
| 2011/0244919 A1 | 10/2011 | Aller et al. | |
| 2011/0284304 A1 | 11/2011 | Van Schoiack | |
| 2012/0290172 A1 | 11/2012 | Saez et al. | |
| 2013/0144520 A1 | 6/2013 | Ricci | |
| 2013/0197715 A1* | 8/2013 | Otanez et al. | 701/2 |
| 2013/0325264 A1* | 12/2013 | Alcazar et al. | 701/49 |
| 2013/0325282 A1 | 12/2013 | Terasaka et al. | |
| 2014/0222295 A1* | 8/2014 | Dornhege et al. | 701/42 |
| 2014/0309870 A1 | 10/2014 | Ricci et al. | |
| 2015/0094914 A1 | 4/2015 | Abreu | |

FOREIGN PATENT DOCUMENTS

WO 2006-084864 A1 8/2006

OTHER PUBLICATIONS

Notice of Allowance in co-pending U.S. Appl. No. 14/525,943, dated Jul. 20, 2015.

* cited by examiner

*Primary Examiner* — Thomas Tarcza
*Assistant Examiner* — Edward Pipala
(74) *Attorney, Agent, or Firm* — Global IP Counselors, LLP

(57) ABSTRACT

A method of customizing a vehicle component control system of a vehicle including creating with a controller a user profile comprising at least one performance characteristic. The user profile is stored in a memory device. At least one vehicle control characteristic of the vehicle component control system is adapted based on the at least one performance characteristic of the user profile.

21 Claims, 9 Drawing Sheets

METHOD OF CUSTOMIZING VEHICLE CONTROL SYSTEM

BACKGROUND

1. Field of the Invention

The present invention generally relates to a method of customizing a vehicle component control system of a vehicle. More specifically, the present invention relates to a method of customizing a vehicle component control system of a vehicle including creating a performance characteristic and adapting a vehicle control characteristic of the vehicle component control system based on the performance characteristic.

2. Background Information

Vehicle drivers have a wide range of physical characteristics, capabilities, preferences and other attributes that affect how each individual driver operates a vehicle. Vehicles are typically designed for a wide range of users but are generally not able to accommodate the particular needs and/or preferences of such a wide range of drivers. Vehicles have recently included means of customizing performance characteristics, such as steering and handling characteristics, through selection of predetermined, fixed settings provided by the manufacturer. For example, some vehicles have fixed modes, such as normal, sport, eco (economical) or snow, that adjust a performance characteristic of the vehicle to correspond to the selected mode. However, the parameters associated with each mode are fixed and cannot be customized to suit the specific needs, requirements and/or preferences of each individual driver. Accordingly, a need exists for a method and system of adjusting a performance characteristic of a vehicle control system to correspond to a user profile associated with each individual driver.

SUMMARY

It has been discovered that customizing a performance characteristic of a vehicle control system of a vehicle to an individual driver is desirable. For example, at least one calibration test is presented to the driver by a stimuli presentation system and a user profile is determined based on the detected response thereto by the driver. The performance characteristic of the vehicle control system of the vehicle can be adjusted to the user profile determined for each individual driver.

In view of the state of the known technology, one aspect of the present disclosure is to provide a method of customizing a vehicle component control system of a vehicle including creating with a controller a user profile comprising at least one performance characteristic. The user profile is stored in a memory device. At least one vehicle control characteristic of the vehicle component control system is adapted based on the at least one performance characteristic of the user profile.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
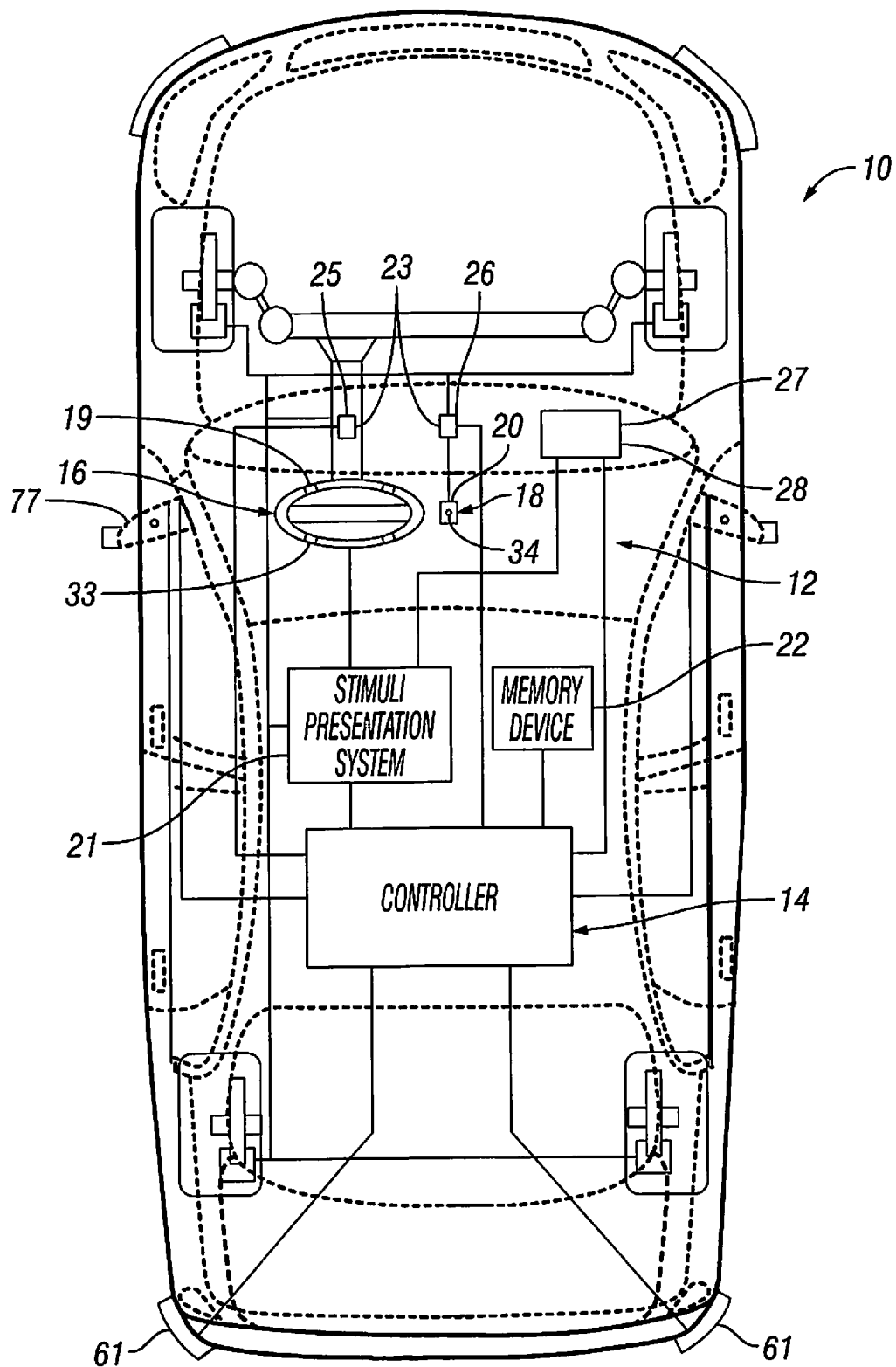
FIG. 1 is a schematic top view of a vehicle having a component control adaptation system in accordance with an exemplary embodiment of the present invention.

The disclosed exemplary embodiments of the present invention are for a component control adaptation system 12 for adjusting a performance characteristic of a vehicle control system of a vehicle 10, as shown in FIG. 1, to correspond to a user profile. A controller 14 of the component control adaptation system 12 can adjust the performance characteristic to correspond to the user profile. The vehicle control system can include, but is not limited to, a steering control system 16 and a braking control system 18. The adjustable performance characteristic can include, but is not limited to, performance characteristics associated with the steering and braking control systems 16 and 18, such as tightness of a steering wheel 19 and tightness of a brake pedal 20 travel to 100% application.

The steering control system 16 includes the steering wheel 19 operatively connected to the steering control system 16 of the vehicle 10 to control the steering control system 16. The braking control system 18 includes a brake pedal 20 operatively connected to the braking control system 18 to control the braking control system 18. The exemplary embodiments of the present invention are described with reference to the steering and braking control systems 16 and 18, although the present invention is not so limited and can be applied to other vehicle control systems.

Referring initially to FIG. 1, the component control adaptation system 12 for a host vehicle 10 is illustrated in accordance with an exemplary embodiment. The component control adaptation system 12 includes a vehicle component (e.g., steering wheel 19, brake pedal 20, clutch pedal, paddle shifters, and brake and acceleration levers/controls disposed around a steering wheel of a handicap equipped vehicle) of a vehicle component control system (e.g., steering control system 16, braking control system 18, acceleration control system and/or transmission control system), a controller 14, an actuation sensor 23, a stimuli presentation system 21 and a memory device 22. The vehicle component can be disposed anywhere in the vehicle.

The actuation sensor 23, such as a steering wheel actuation sensor 25 or a brake pedal actuation sensor 26, detects actuation of the vehicle component, such as the steering wheel 19 or the brake pedal 20, respectively. The controller 14 is configured to determine and store a user profile in the memory device 22 while the vehicle 10 is in a non-motive state. The controller 14 is configured to present a stimulus via a stimuli presentation system 21, as shown, for example, in FIG. 2. The actuation sensor 23 communicates with the controller 14 to detect actuation of the vehicle component in response to the presented stimulus. A user profile is determined based on a comparison of the detected actuation of the vehicle component to a baseline profile stored in the memory device 22. Alternatively, the user profile can be updated based on a comparison to an existing (i.e., previously created) user profile. The determined user profile is stored in the memory device 22. The memory device 22 can be on-board, off-board (e.g., the cloud), or portable (e.g., a memory card or mobile device) and connectable to the on-board system. An adjustable performance characteristic of the vehicle control system can be adjusted to correspond to the user profile.

The controller 14 preferably includes a microcomputer with a control program that controls the component control adaptation system 12 as discussed below. The controller 14 can also include other conventional components such as an input interface circuit, an output interface circuit, and storage device(s), such as a ROM (Read Only Memory) device and a RAM (Random Access Memory) device. The microcomputer of the controller 14 is programmed to control one or more of the stimuli presentation system 21, the actuation sensor 23, and the memory device 22, and to make determinations or decisions, as discussed herein. The controller 14 is operatively coupled to the steering control system 16, the braking control system 18 and the actuation sensor 23 in a conventional manner, thereby enabling the controller 14 to monitor and control any of these systems as desired. It will be apparent to those skilled in the art from this disclosure that the precise structure and algorithms for the controller 14 can be any combination of hardware and software that will carry out the functions of the present invention. Portions of the controller 14 and/or functions thereof can be disposed off-board, and in communication with the controller 14.

Figure 2:
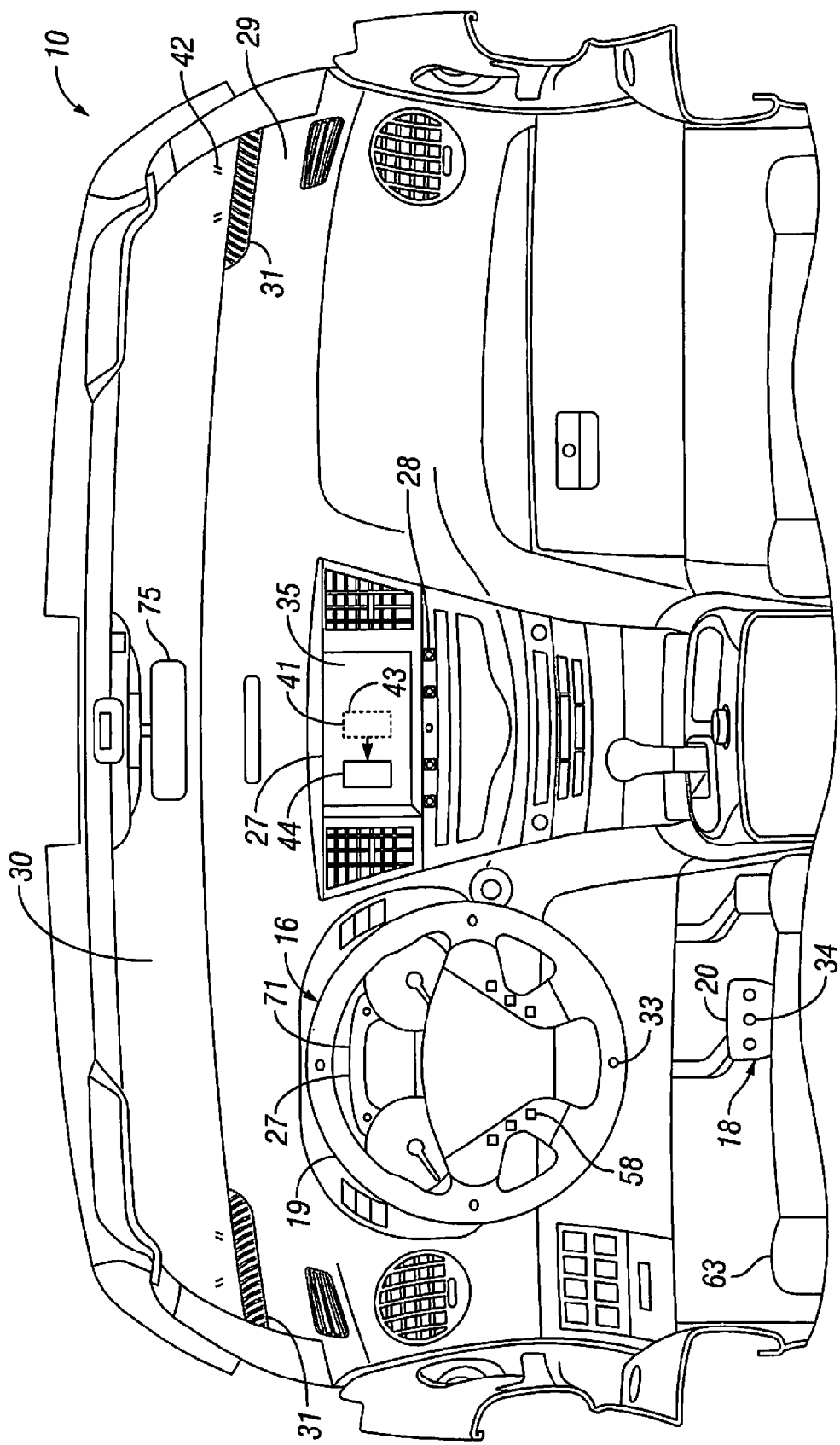
FIG. 2 is a perspective view of a vehicle cockpit including an in-dash display.
Figure 3:
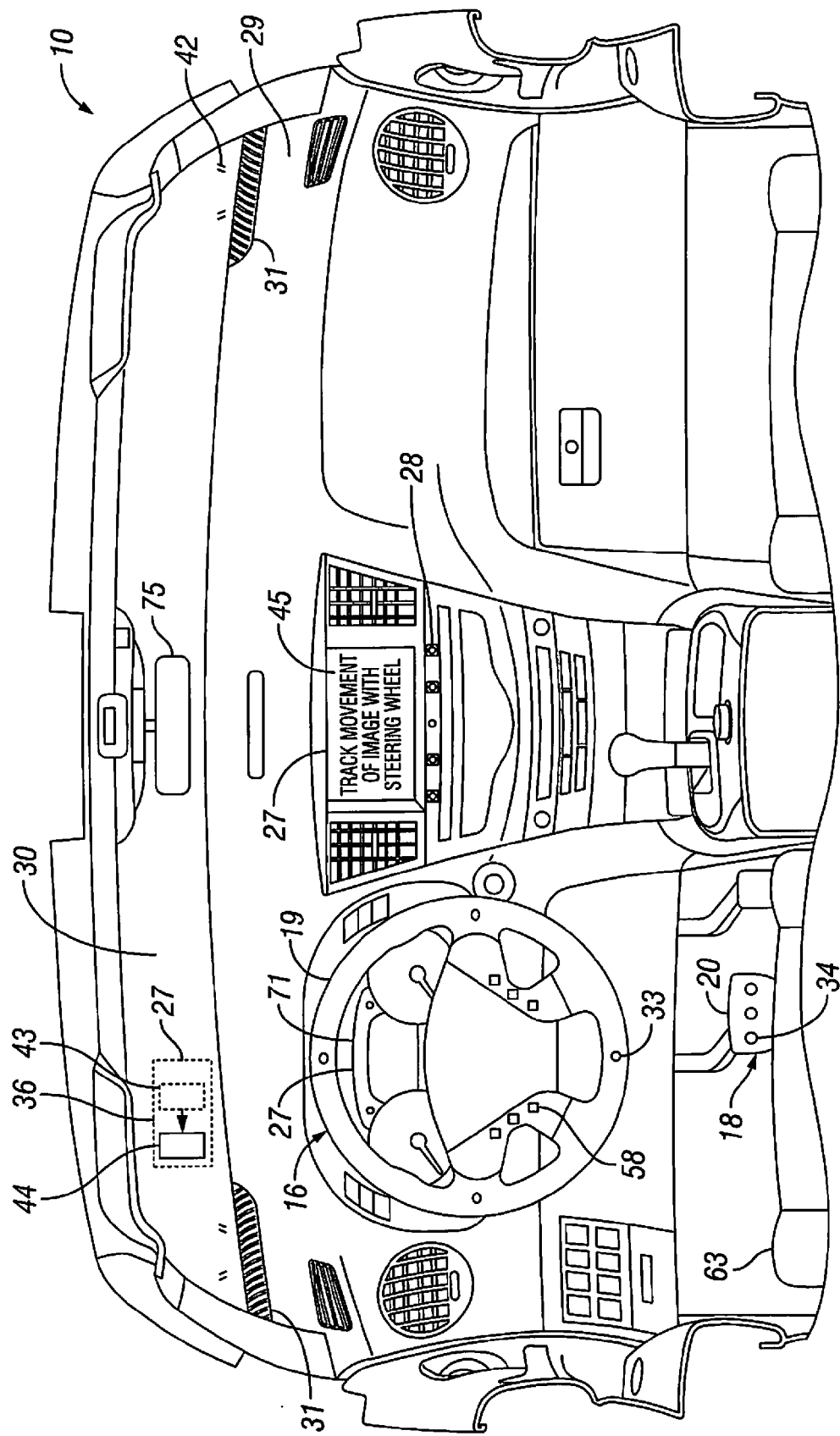
FIG. 3 is a perspective view of a vehicle cockpit including a heads-up display.

As shown in FIG. 1, the controller 14 is in communication with a display 27, which can include a user input device 28, thereby enabling a user to interact with the controller 14 and the component control adaptation system 12. The controller 14 can further include or be in communication with one or more memory device(s) 22, which can store information, such as the user profile and a baseline profile, as discussed herein. The driver can interact with the control adaptation system 12 through the user input device 28 associated with the display 27, or user inputs 58 associated with the steering wheel 19, as shown in FIGS. 2 and 3. Alternatively, any suitable user inputs can be provided, such as voice recognition and/or gesture inputs.

In an exemplary embodiment of the present invention, the component control adaptation system 12 adjusts a performance characteristic of the steering control system 16. Stimuli are presented to the driver by the stimuli presentation system 21. The stimuli can be visual images displayed by a display 27, as shown in FIGS. 2 and 3. The display 27 can be a display 35 disposed in the center stack or instrument panel 29, as shown in FIG. 2. Alternatively, the display 27 can be a heads-up display 36 displayed on a front windshield 30 of the vehicle 10, as shown in FIG. 3. Alternatively, the display 27 can be a meter cluster display 71, as shown in FIG. 2. The presented stimuli can be displayed by a single display 27 or by a combination of displays, such as, for example, the instrument panel display 35 and the meter cluster display 71. The stimuli can also be presented in the rear view mirror 75, side mirrors 77, and/or side windows. Alternatively, the stimuli can be auditory stimuli 42 presented by speakers 31 disposed in the instrument panel 29, as shown in FIGS. 2 and 3.

Figure 11:
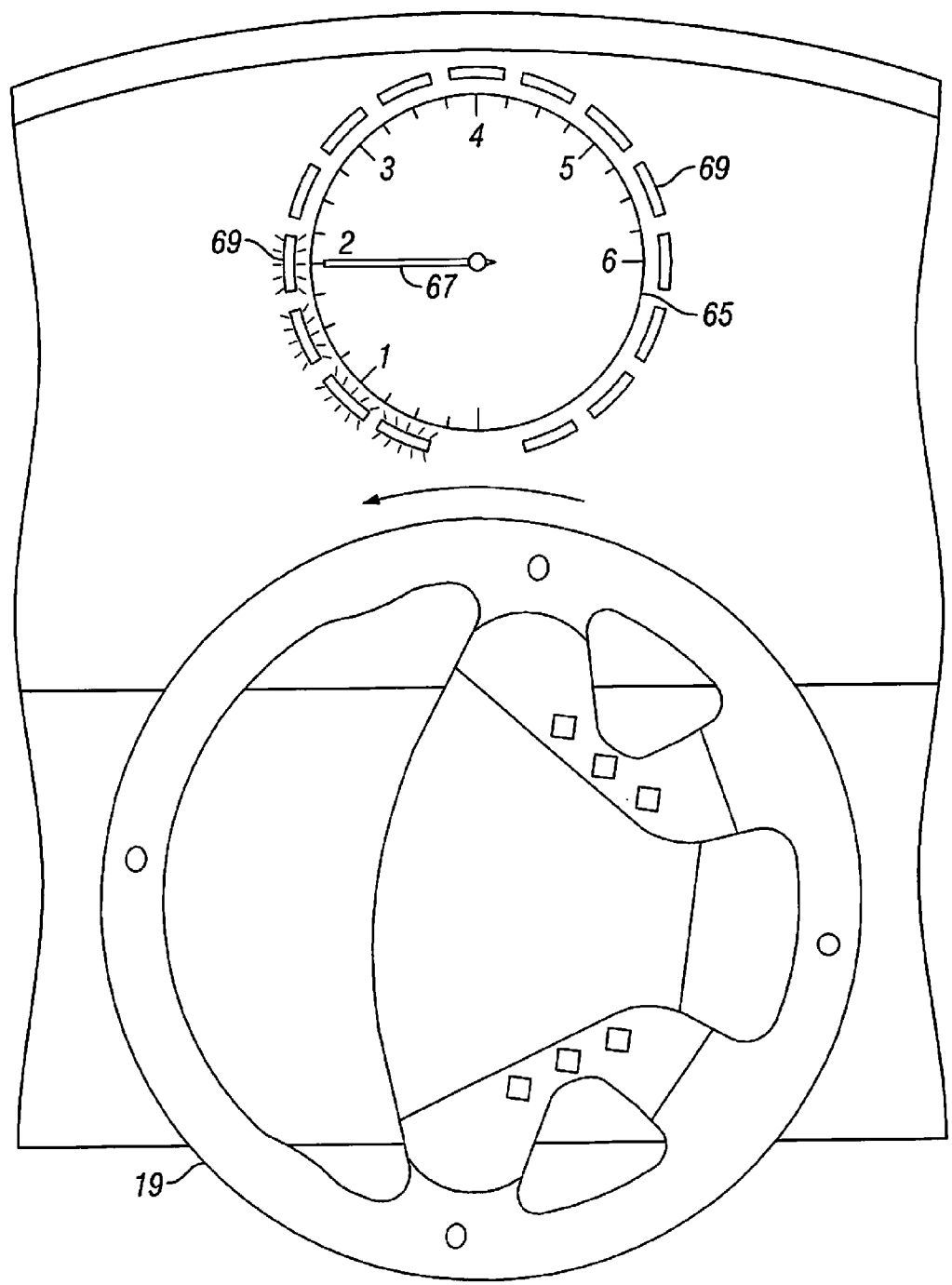
FIG. 11 is an illustration of an in-dash display in which a mechanical pointer is controlled during a calibration test by operation of a vehicle component by a user.

As shown in FIG. 11, the meter cluster display 71 includes at least one display dial 65 having a mechanical pointer 67. A plurality of indicator lights 69, such as light emitting diodes, circumferentially surround the display dial 65. The indicator lights 69 can be illuminated as the presented stimuli and the mechanical pointer 67 can be controlled by the vehicle component, such as the steering wheel 19 or brake pedal 20, responsive to the presented stimuli.

The stimuli can also be presented through haptic feedback of the vehicle control system being customized. For example, the driver can be prompted to push the brake pedal 20 until vibration of the brake pedal is sensed by the driver. Haptic feedback through the steering wheel can also be customized based on user adjustment and/or real time analysis of contact with the steering wheel sensed by sensors 33.

A user profile is created to customize or fine tune at least one performance characteristic of at least one vehicle control system. Such customization accounts for physical characteristics, capabilities, preferences and/or other attributes of the driver. The user profile is determined through at least one calibration test, which requires the driver to respond to a presented stimulus. The user profile is indicative of the driver's ability to manipulate the vehicle control. The results of the calibration test are compared to a baseline profile stored in the memory device 22 to determine the user profile for the driver. The user profile is stored in the memory device 22. The performance characteristic of the vehicle control system can be adjusted to correspond to the user profile. Accordingly, each individual driver has a personal, customized user profile. The customized user profile improves the driving experience for the driver, in addition to providing a safer driving experience. The vehicle component, such as the steering wheel 19 or the brake pedal 20, is operatively disconnected from a remainder of the vehicle component control system when creating the performance characteristic.

Figure 10:
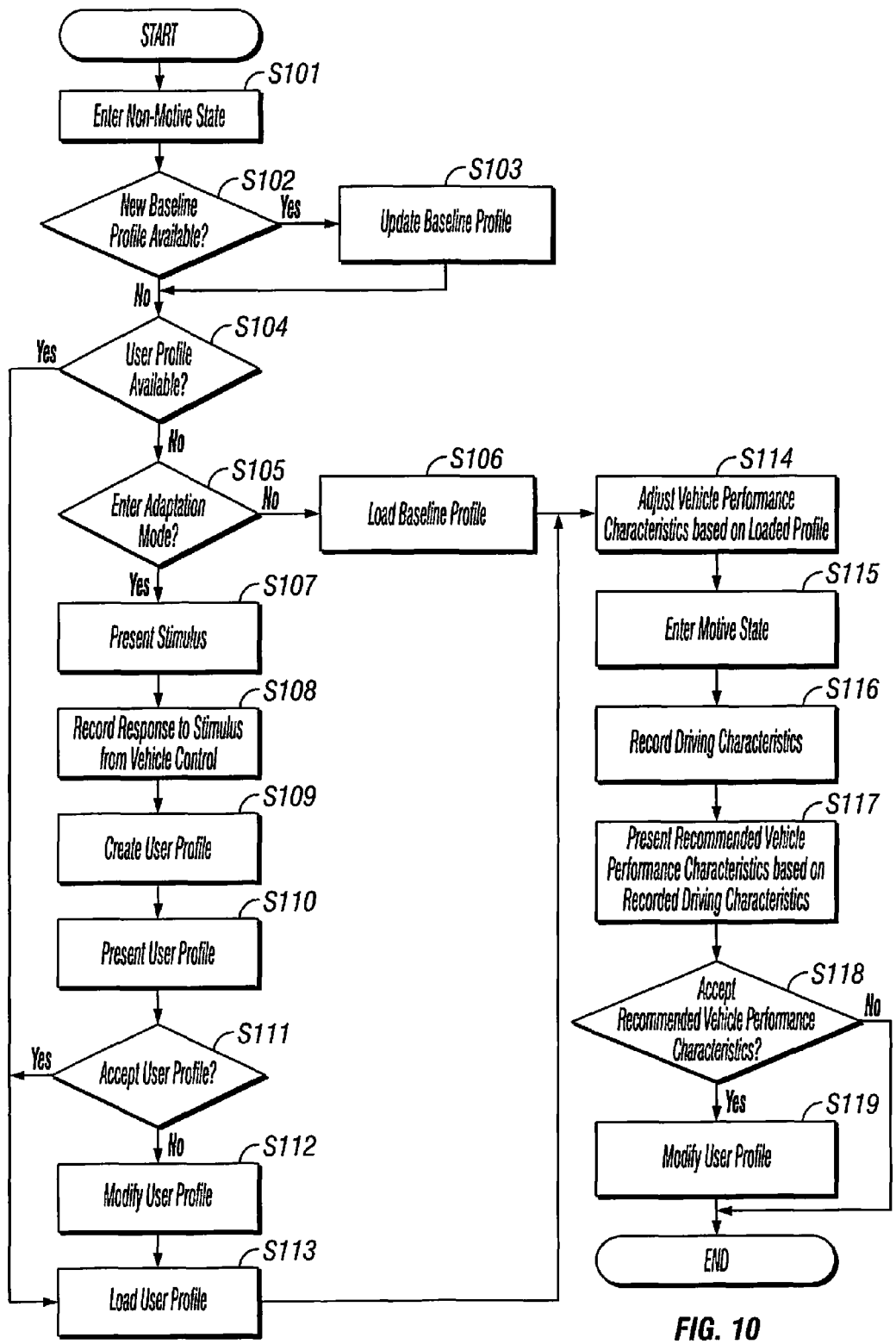
FIG. 10 is a flowchart illustrating capturing a user profile and adjusting a performance characteristic of the vehicle control system to correspond to the user profile.

FIG. 10 includes a flowchart that illustrates capturing a user profile and adjusting a performance characteristic of the vehicle control system to correspond to the user profile. When the vehicle 10 is in the non-motive state (S101), the controller 14 can check to determine whether an update to the baseline profile is available (S102), and the baseline profile is updated when available (S103). The controller 14 can determine whether a user profile is available (S104). When a user profile is not available, the driver is prompted whether the adaptation mode should be entered to create a user profile (S105). Accordingly, when a user profile is available that the driver wants to use without modification, the driver can opt to load the user profile (S106). The driver can also opt to load a baseline profile (S106) when a user profile is not available and the driver does not wish to create a user profile or when the driver elects to use the baseline profile instead of a user profile. When a profile (either a user or baseline profile) is loaded and the adaptation mode is not entered, the vehicle performance characteristics are adjusted to correspond to the loaded profile (S114).

When the adaptation mode is entered (S105), the user is presented with a stimulus (S107) by the stimuli presentation system 21 (FIG. 1). As described in more detail below, the stimulus can include a range of motion calibration test, a strength calibration test, a reaction time calibration test, a steering entropy calibration test, or any other tests related to the vehicle component system to be adjusted. The response to the stimulus from the vehicle control system is recorded (S108). These tests can be individually selected by the driver, or otherwise repeated in succession to create and customize the user profile for multiple performance characteristics (S109). Alternatively, the component control adaptation system 12 can individually select calibration tests based on control characteristics that are detected to be operating outside of expectations.

The customized user profile is then presented to the driver (S110). The user profile can be presented to the driver in any suitable manner, such as visually (e.g., graphically) and/or textually. The graphical presentation can include, but is not limited to, a line or bar chart, or other suitable representation allowing the driver to determine differences between profile choices. The driver is prompted whether the user profile is acceptable (S111). When the user profile is acceptable, the user profile is loaded (S113), and the vehicle performance characteristic is adjusted to correspond to the accepted user profile (S114). Alternatively, the driver can reject the user profile, and modify parameters thereof (S112). The modified user profile is then loaded (S113), and the vehicle performance characteristic is adjusted to correspond to the accepted user profile (S114). The driver can operate the vehicle control after application of the user profile while the vehicle is in the non-motive state to determine whether the driver is comfortable with the parameters of the created and applied user profile. The driver can enter a test drive mode, after application of the user profile, during which the driver operates the vehicle. A plurality of characteristics can be changed successively during the test drive mode for comparison by the driver. Following operation of the vehicle and returning to a non-motive state, the driver is prompted to accept or adjust the characteristics associated with the user profile.

Once the vehicle performance characteristic is adjusted based on the loaded profile (S114), the vehicle 10 can enter the motive state (S115) such that the vehicle control system operates in accordance with the adjusted vehicle performance characteristic while the vehicle 10 is operated. When the vehicle 10 is in the motive state, driving characteristics can be recorded (S116). The driver can be presented with recommended vehicle performance characteristics based on the recorded driving characteristics (S117). The driver is then prompted whether the recommended performance characteristics are acceptable (S118). When the driver accepts the recommended performance characteristics, the user profile is modified to reflect the recommended performance characteristics (S119). When the driver does not accept the recommended performance characteristics, the user profile is not modified.

As shown in S102 of FIG. 10, the baseline profile is stored in the memory device 22 (FIG. 1). The baseline profile can be updated, as shown in S103. Changes to the baseline profile can be made through remote, wireless updates, such as updates to the baseline profile received from a central database of an original equipment manufacturer (OEM) or dealership, for example. The baseline profile updates can be automatic or can be initiated by the driver.

Additionally, user profiles can be wirelessly transmitted to a central database from a plurality of host vehicles 10. The transmitted user profiles can be periodically aggregated to create an updated baseline profile based on an analysis of the aggregated user profiles. The updated baseline profile can then be wirelessly transmitted to the vehicle 10 (FIG. 1) and stored in the memory device 22.

The driver is prompted regarding the availability of the user profile in S104. The user profile can be previously created through the adaptation mode and stored on-board the vehicle 10 in the memory device 22. Alternatively, a previously created user profile can be transferred to the memory device 22 from a portable data storage device. When a user profile is not available, the adaptation mode can be entered to create the user profile. Additionally, the adaptation mode can be entered to modify an existing user profile. Alternatively, the driver can elect to use the baseline profile. Adjustments to the user profile can be made remotely, e.g., through an internet portal of an application on a mobile device.

The controller 14 (FIG. 1) initiates the adaptation mode in S105. The adaptation mode can be used to modify a previously created user profile, or can be used to create a new user profile. The adaptation mode can include, but is not limited to, a steering adaptation mode and a braking adaptation mode.

To create or adjust the user profile, the stimuli presentation system 21 (FIG. 1) presents a stimulus to the driver in S107. The presented stimulus can include a range of motion calibration test, a strength calibration test, a reaction time calibration test, a steering entropy calibration test, or any other tests related to the vehicle component system to be adjusted. The driver responds to the presented stimuli through operation of the vehicle component, such as the steering wheel 19 or the brake pedal 20. The controller 14 (FIG. 1) receives a signal from the actuator sensor 23 (FIG. 1) based on the detected actuation of the vehicle component responsive to the presented stimuli, and records the responses to the stimuli from the vehicle control system in S108.

As one example, the controller 14 initiates a steering adaptation mode S105, as shown in FIG. 10. To adjust a performance characteristic of the steering control system 16, at least one of several calibration tests can be conducted. The calibration tests are conducted when the vehicle 10 is in a non-motive state. The calibration tests can include, but are not limited to, strength calibration, reaction time calibration, range of motion calibration and steering entropy calibration, as described below. The steering wheel 19 is preferably not directly linked to a steering rack in the non-motive state, such that the steering wheel can turn freely. In electronic control systems (e.g., steer-by-wire), the control can be disconnected so that only the control (e.g., the steering wheel) is manipulated without actuating the resulting component (e.g., the wheels). The vehicle component, such as the steering wheel 19 or the brake pedal 20, is operatively disconnected from a remainder of the vehicle component control system when creating the performance characteristic.

Figure 8:
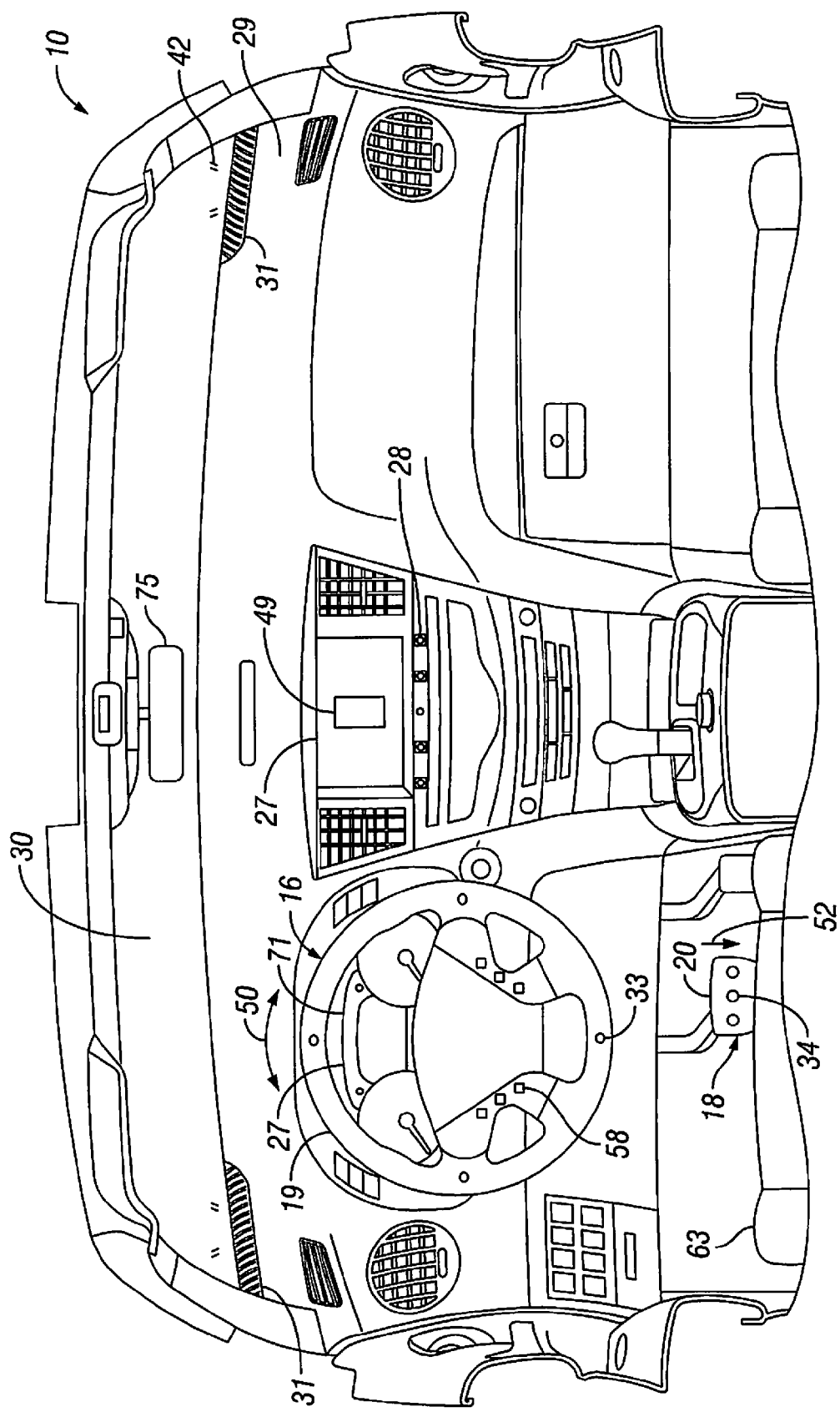
FIG. 8 is an illustration of a calibration test in which a user is prompted to actuate a vehicle component responsive to a presented stimulus.

In the strength calibration test, the driver is prompted to turn the steering wheel 19 as quickly as possible until indicated to stop. In addition to or instead of speed, the driver can be prompted to turn the steering wheel 19 as hard as possible until indicated to stop to test the driver's strength through a range of motion. The strength calibration test determines a strength characteristic. The prompt can be a visual image 49 (FIG. 8) displayed on the display 27 or can be an auditory stimulus 42 projected from the speakers 31. Upon seeing the displayed image 49 or hearing the auditory stimulus 42, the driver turns the steering in a direction indicated by arrow 50 as instructed. The actuation sensor 25 (FIG. 1) operatively connected to the steering wheel 19 detects actuation of the steering wheel 19 and communicates with the controller 14 to record the driver's response to the presented stimulus into the memory device 22. The speed of actuation is determined following the presented stimulus. The strength calibration test can be repeated with different resistance forces applied to the steering wheel 19 by the controller 14. The controller 14 can cause the stimuli presentation system 21 to display a prompt on the display requesting the user to select which of a plurality of resistance forces applied to the steering wheel 19 is more comfortable. The driver can select the option through the user inputs 28 associated with the display 27, or user inputs 58 associated with the steering wheel 19. The user inputs can include a plurality of buttons and/or dials, as shown in FIG. 2. The strength calibration test can be repeated until the driver selects a resistance with which the driver is comfortable.

In the reaction time calibration test, the driver is prompted to turn the steering wheel 19 as soon as a visual or auditory stimulus is presented. The reaction time calibration test determines a reaction characteristic. The stimuli can be presented haptically. The visual stimulus 41 (FIG. 2) is displayed on the display 27. The auditory stimulus 42 (FIG. 2) is projected from the speakers 31. When the driver sees the displayed image (49 of FIG. 8) or hears the auditory stimulus (42 of FIG. 8), the driver turns the steering wheel 19 in the direction indicated by the arrow 50 as instructed. The actuation sensor 25 (FIG. 1) operatively connected to the steering wheel 19 detects actuation of the steering wheel 19 and communicates with the controller 14 the driver's response to the presented stimulus. The time to actuation is determined after first presenting a first stimulus in which an instruction to actuate the vehicle component as quickly as possible after a second stimulus. The second stimulus is then presented, and the time to actuation is determined. The reaction time calibration test can be repeated to determine the driver's response time to presented stimuli.

Figure 9:
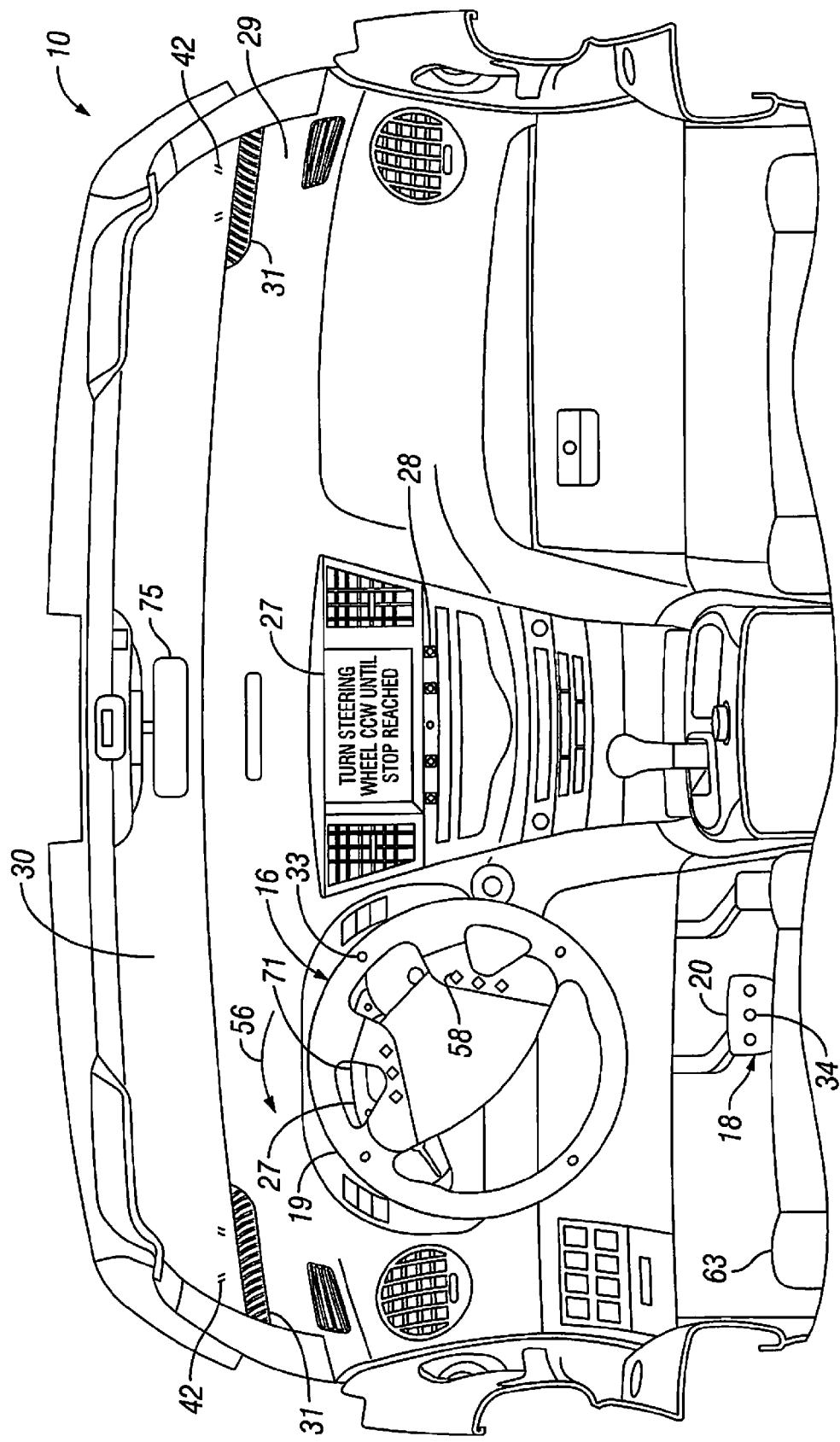
FIG. 9 is an illustration of a calibration test in which a user is prompted to track movement of an object displayed by the stimuli presentation system.

In the range of motion calibration test, the driver is prompted to turn the steering wheel 19 a set number of rotations until a steering stop is reached, as shown in FIG. 9. The range of motion calibration test determines a range of motion characteristic. The stimulus can be visually displayed on the display 27 or audibly presented through the speakers 31. When the driver sees the displayed image (54 of FIG. 9) or hears the auditory stimulus (42 of FIG. 9), the driver turns the steering wheel 19 in the direction indicated by the arrow 56 as instructed. The actuation sensor 25 (FIG. 1) operatively connected to the steering wheel 19 detects actuation of the steering wheel 19 and communicates with the controller 14 the driver's response to the presented stimulus. After the stimulus is presented, the amount of actuation is determined. The range of motion calibration test can also test the physical range of motion of the driver. This can include detecting when the driver changes from two-handed operation to one-handed operation, and/or from one-handed operation to two-handed operation. Additionally, the driver can be prompted to turn the steering wheel with one hand in a direction until a stop is reached, and then repeat with two hands. The driver can also be prompted to turn the steering wheel to the stop in a certain direction with either one or two hands, whichever is comfortable.

In the steering entropy calibration test, the driver is prompted to perform a tracking and compensatory task to determine an entropy characteristic. The steering entropy calibration tests lane keeping ability. The steering entropy calibration test determines corresponding actuation after presenting a stimulus. The presented stimulus includes displaying a representation of the vehicle with a plurality of boundary marking and movement of the representation of the vehicle relative to the boundary markings. The entropy characteristic is determined by detecting actuation of the vehicle component corresponding to movement of the representation of the vehicle.

Figure 7:
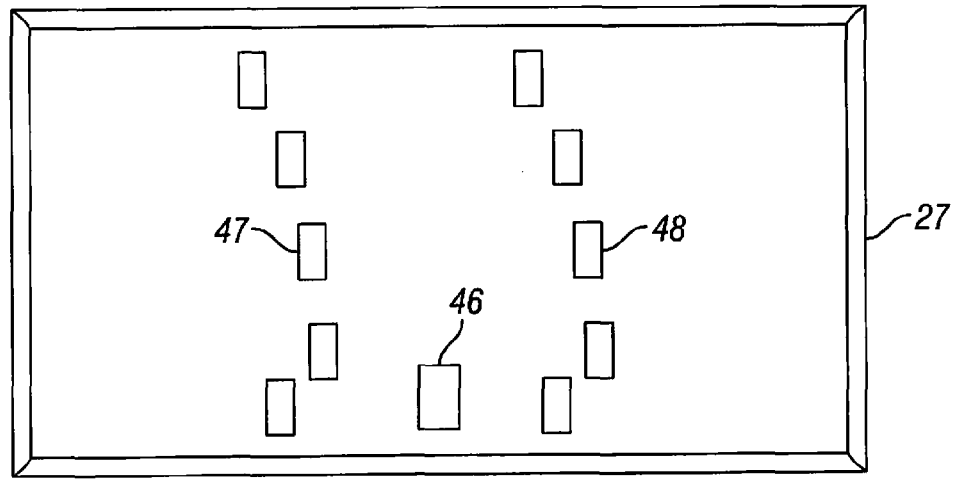
FIG. 7 is an illustration of a steering entropy calibration test in which a user responds to objects displayed by a stimuli presentation system.

For example, the driver operates the steering wheel 19 to track a moving image on the display 27, as shown in FIGS. 2, 3 and 9. The driver turns the steering wheel to track movement of the image 41 between a first position 43 and a second position 44 of the image. Text 45 can be displayed on the display 27, as shown in FIGS. 2 and 3, to prompt the user to track movement of the image with the steering wheel 19. Alternatively, the user can be prompted by an auditory message emitted from the speakers 31. Another exemplary steering entropy calibration test prompts the driver to control an image 46 on the display 27 with the steering wheel 19 and moves the steering wheel 19 to maintain the image between oppositely disposed moving obstacles 47 and 48, as shown in FIG. 7. The display 27 of FIG. 7 can be representative of a single or multiple lane road.

When driving the vehicle 10, the driver continuously assesses the situation and unconsciously employs smooth and predictable steering control. Smooth can be defined as turning the steering wheel a little at a time in small increments. When the driver is distracted or otherwise impaired, the driver does not monitor the environment as effectively and the vehicle can deviate laterally. Steering predictability decreases as the driver introduces more corrective maneuvers, which increases as distraction or impairment increases. The steering entropy calibration test assesses the driver's corrective steering tendencies and accordingly modifies a performance characteristic of the steering control system 16.

A plurality of sensors 33 are disposed in the steering wheel 19, as shown in FIG. 2, to determine whether the driver is using one or two hands, as well as determining the hand position employed by the driver. The sensors 33 can be capacitive touch sensors, although any suitable sensors can be used. The driver can be prompted to perform the above tests (strength calibration test, reaction time calibration test, range of motion calibration test and steering entropy calibration test) with one or two hands to determine differences therebetween. Accordingly, the controller 14 can adjust a performance characteristic of the steering control system 16 responsive to whether the sensors 33 detect one or two-handed operation, as well as adjusting a performance characteristic that is responsive to the detected driver's hand position. The sensors 33 can also detect whether the driver is wearing heavy gloves and haptic feedback to the steering wheel 19 is adjusted accordingly. The sensors 33 act as contact sensors to detect a contact condition of the steering wheel 19. Any vehicle component can include a contact sensor to detect a contact condition thereof. A vehicle control characteristic of the vehicle component control system can be readjusted based on the performance characteristic and the contact condition.

The strength calibration test, reaction time calibration test and range of motion calibration test can be conducted with the driver first moving the steering wheel 19 in one direction (e.g., clockwise), and then moving the steering wheel 19 in the opposite direction (e.g., counterclockwise). The actuation sensors 25 detect actuation of the steering wheel 19, and the controller 14 determines the user profile based on a comparison with the baseline profile. Additional calibration tests can also be conducted to determine the driver's responsiveness in a normal driving situation and/or an emergency driving situation. Visual images can be displayed, such as vehicles and other objects, to determine how the driver responds to the presented situations and reaction times to warnings.

In another example, the controller 14 initiates the braking adaptation mode (S105) to adjust a performance characteristic of the braking control system 18. Stimuli are presented to the driver by the stimuli presentation system 21 (S107). The stimuli can be visual images displayed by a display 27 disposed in the instrument panel 29, as shown in FIG. 2. Alternatively, the display 27 can be a heads-up display 36 displayed on the windshield 30 of the vehicle 10, as shown in FIG. 3. Alternatively, the stimuli can be an auditory stimuli emitted by the speakers 31, as shown in FIGS. 2 and 3.

To adjust a performance characteristic of the braking control system 18, several calibration tests can be conducted. The calibration tests are conducted when the vehicle 10 is in a non-motive state. The calibration tests can include, but are not limited to, strength calibration, reaction time calibration and range of motion calibration, as described below. The brake boosters can be modulated electrically, such that the brake pedal 20 can be operated in a simulated manner when the vehicle 10 is in a non-motive state.

In the strength calibration test, the driver is prompted to push the brake pedal 20, either once or several times, as quickly as possible until indicated to stop. In addition to or instead of speed, the driver can be prompted to push the brake pedal 20 as hard or forcefully as possible until indicated to stop to test the driver's strength through a range of motion. The prompt can be a visual image displayed on the display 27 or can be an auditory stimulus projected from the speakers 31. When the driver sees the displayed image (49 of FIG. 8) or hears the auditory stimulus (42 of FIG. 8), the driver applies force as instructed to the brake pedal 20 as indicated by the arrow 52. The actuation sensor 26 (FIG. 1) operatively connected to the brake pedal 20 detects actuation of the brake pedal 20 and communicates with the controller 14 the driver's response to the presented stimulus. The strength calibration test can be repeated with different resistance forces applied to the brake pedal 20 by the controller 14. The controller 14 can cause the stimuli presentation system 21 to display a prompt on the display 27 requesting the user to select which of a plurality of resistance forces applied to the brake pedal 20 is more comfortable. The driver can select the option through the user inputs 28 associated with the display 27, or user inputs 58 associated with the steering wheel 19. The user inputs can include a plurality of buttons and/or dials. The test can be repeated until the driver selects a resistance with which the driver is comfortable.

In the reaction time calibration test, the driver is prompted to push the brake pedal 20 as soon as a visual or auditory stimulus is presented. The visual stimulus is displayed on the display 27. The auditory stimulus is projected from the speakers 31. When the driver sees the displayed image (49 of FIG. 8) or hears the auditory stimulus (42 of FIG. 8), the driver applies force as instructed to the brake pedal 20 as indicated by the arrow 52. The actuation sensor 26 (FIG. 1) operatively connected to the brake pedal 20 detects actuation of the brake pedal 20 and communicates with the controller 14 to record the driver's responses to the presented stimuli into the memory device 22. The reaction time calibration test can be repeated to determine the driver's response time to presented stimuli.

In the range of motion calibration test, the driver is prompted to push the brake pedal 20 as far down as possible or until a braking stop is reached. The stimulus can be visually displayed on the display 27 or audibly presented through the speakers 31. When the driver sees the displayed image (49 of FIG. 8) or hears the auditory stimulus (42 of FIG. 8), the driver applies force as instructed to the brake pedal 20 as indicated by the arrow 52. The actuation sensor 26 (FIG. 1) operatively connected to the brake pedal 20 detects actuation of the brake pedal 20 and communicates with the controller 14 the driver's response to the presented stimulus.

A plurality of sensors 34 are disposed in the brake pedal 20 to detect a position of the driver's foot on the brake pedal 20. The sensors 34 can be pressure sensors or capacitive touch sensors, although any suitable sensors can be used. Accordingly, the controller 14 can adjust a performance characteristic of the braking control system 18 responsive to the foot position detected by the sensors 34. The sensors 34 act as contact sensors to detect a contact condition of the brake pedal 20. A vehicle control characteristic of the vehicle component control system can be readjusted based on the performance characteristic and the contact condition.

The plurality of calibration tests in the adaptation mode can be repeated in succession to customize the user profile for multiple performance characteristics. Additionally, multiple characteristics can be implemented for comparison during successive tests, such that the driver can choose the preferred characteristic. Other characteristics can be presented to the driver based on the preferred characteristic. The responses to the presented stimuli from the vehicle control system are recorded (S108). The resulting data is compared to the baseline profile to determine and create the user profile for the driver (S109). The user profile is saved and stored in the memory device 22.

Additional drivers can conduct the calibration tests, such that a plurality of user profiles are stored in the memory device 22. Accordingly, prior to entering the motive state of the vehicle (S115), the appropriate user profile is selected by the driver from the plurality of user profiles stored on the memory device 22. The driver can also save a plurality of user profiles to the memory device 22, in which each user profile is directed to a different driving experience desired by the driver.

The controller 14 (FIG. 1) determines the user profile based on a comparison of the recorded responses to the presented stimuli from the vehicle control system to the baseline profile stored in the memory device 22 (FIG. 1) in S109. In S110, the created user profile is presented to the driver. In S111, the driver can determine whether to accept the created user profile, which is then loaded (S113). Parameters of the user profile associated with the performance characteristic are displayed for confirmation or adjustment by the driver. The performance characteristic of the vehicle control system is adjusted to correspond to the user profile (S114). When the user profile is accepted, the vehicle 10 (FIG. 1) can enter the motive state in S115.

Figure 5:
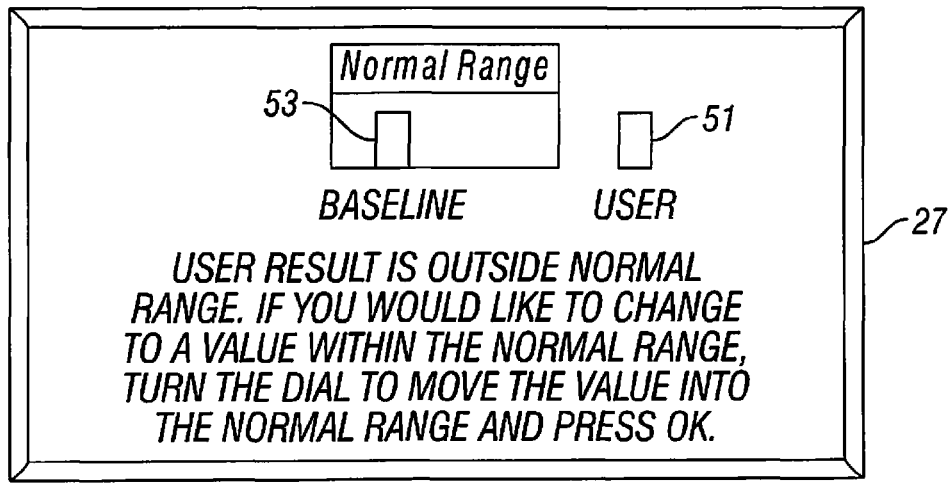
FIG. 5 is an illustration of a display in which a user profile is compared to a baseline profile.

When the driver opts to not accept the user profile, the driver can manually adjust parameters of the user profile in S112. As shown in FIG. 5, for example, a performance characteristic of the user profile 51 is compared to the performance characteristic of the baseline profile 53. As shown in FIG. 5, the user profile 51 falls outside a normal range of the baseline profile 53. The driver is prompted to move the value to a setting within the normal range, such as by operating a dial of the input device 28, if desired. Alternatively, the driver can accept the value outside the normal range. The driver is prompted whether the determined user profile is acceptable. The driver can either accept the determined user profile (S111), accept the performance characteristic of the baseline profile (S106) or manually adjust the user profile to a desired setting (S112). The manually adjusted user profile is then saved to the memory device 22 (FIG. 1), and the modified user profile is loaded (S113). When the user profile is manually adjusted, the vehicle 10 can enter the motive state in S115 with the performance characteristic of the vehicle control system adjusted to correspond to the manually adjusted user profile (S114).

The performance characteristic of the vehicle control system is adjusted to correspond to the determined user profile for the driver (S114). The performance characteristic can be adjusted by adjusting a response to a signal from the vehicle component or by adjusting the movability of the vehicle component. For example, the resistance of the vehicle component, such as the steering wheel 19 or the brake pedal 20, can be adjusted. The resistance can be adjusted hydraulically or magnetorheologically, although any suitable manner of adjusting the resistance of the vehicle component can be used. As another example, the range of the brake pedal 20 from 0 to 100% force application is adjusted such that the range from 0 to 100% force application is different (e.g., decreased or increased) to correspond to the user profile.

Figure 4:
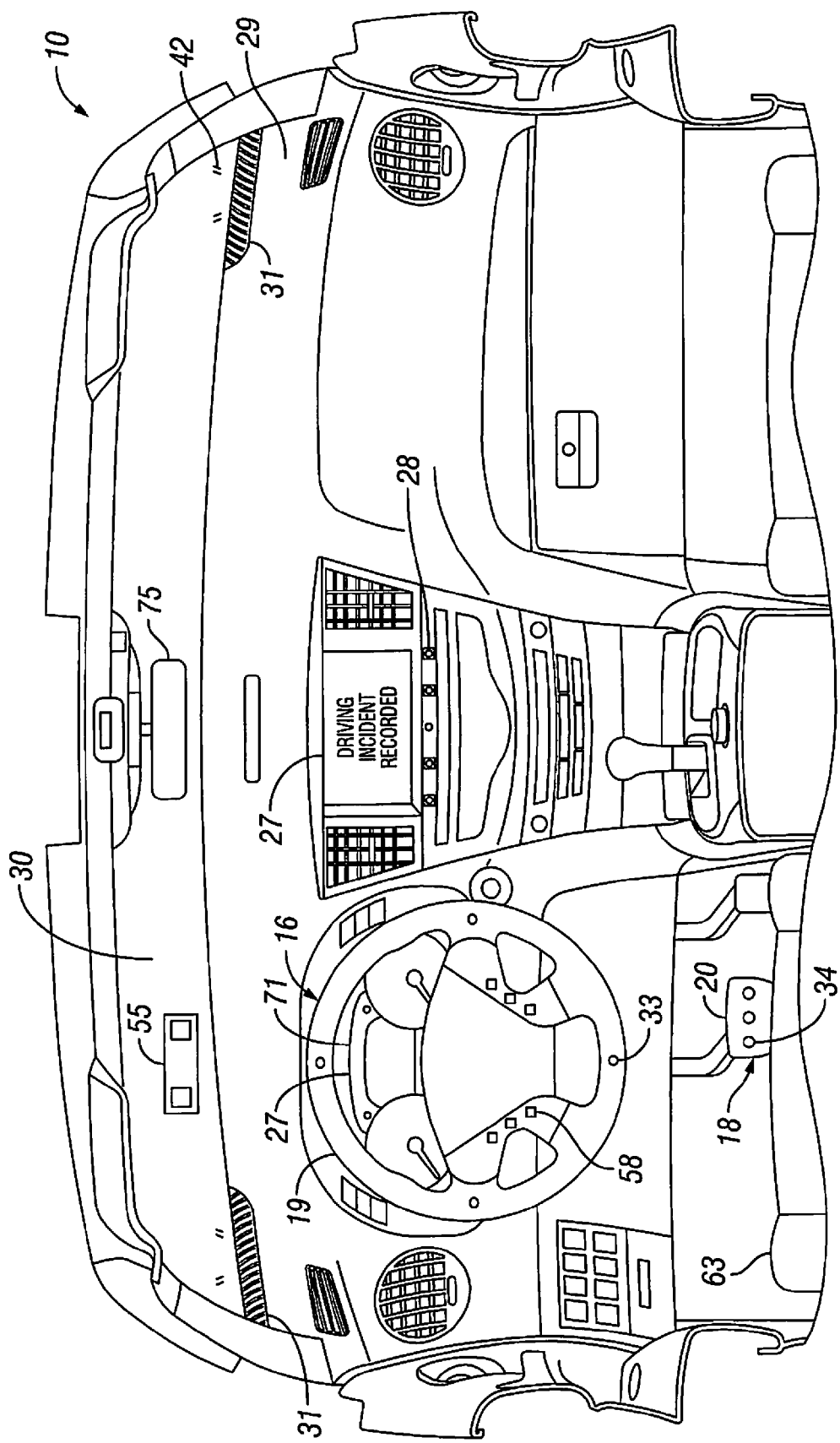
FIG. 4 is a perspective view of a vehicle cockpit while the vehicle is in a motive state.
Figure 6:
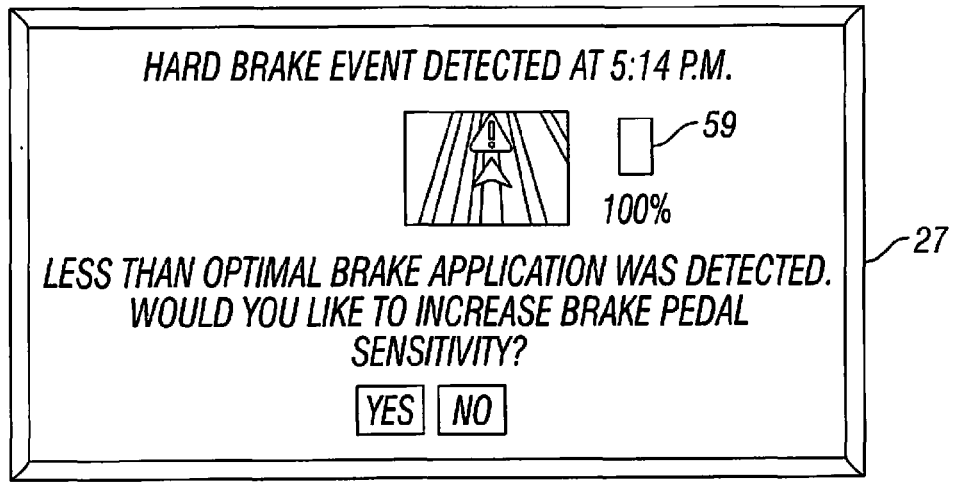
FIG. 6 is an illustration of a display in which a driver is prompted to respond to a recorded driving incident.

When the vehicle 10 is in the motive state, the controller 14 can record a driving incident to the memory device 22 (S116 of FIG. 10). For example, when the driver of the vehicle 10 applies the brake 20 suddenly behind another braking vehicle 55, the controller 14 saves the incident to the memory device 22, as indicated on the display 27 in FIG. 4. The display 27 can display text indicating to the driver that the driving incident has been recorded to the memory device 22. When the driving event is complete and the vehicle 10 returns to the non-motive state, the recorded driving incident can be presented to the driver, as shown in S117 of FIG. 10. The display 27 can prompt the driver regarding the driving incident, as shown in FIG. 6. The display 27 can show the percentage of brake application for the driver (e.g., 80%) 57 compared to an expected baseline brake application (e.g., 100%) 59. The driver can be notified that less than optimal brake application was detected during the driving incident, as shown in FIG. 6, and prompted as to whether an increase in brake pedal sensitivity is desired. The driver is then prompted whether the user profile should be updated based on a recommended performance characteristic (S118). The driver can respond that the brake was applied as intended and that the user profile should not be modified, or that the driver was not able to fully apply the brake and that the performance characteristic for the brake control system 18 should be adjusted accordingly (S119 of FIG. 10).

In another example, a front collision warning system detects a hazard and records that the driver responded in X seconds and was able to reduce the vehicle speed in Y seconds to finally stop the vehicle within Z feet of the hazard (e.g., another vehicle). When the ideal gap should have been larger, e.g., Z+five feet, a recommended change to a performance characteristic of the brake control system 18 can be recommended to the driver to increase the margin of safety. The driver can then elect whether to modify the user profile accordingly or to maintain the original user profile.

Additionally, the memory device 22 can save driving characteristics or tendencies of the driver (S116 of FIG. 10), such as force with which the steering wheel 19 is operated or force applied to the brake pedal 20. The driver can be periodically queried whether the user profile should be updated with recommended performance characteristics based on the recorded driving characteristics of the driver (S117 of FIG. 10). For example, when the driver has a tendency to respond slowly to an event, a recommendation can be made to adjust the amount of steering input required to respond to an event. The driver can accept the recommended performance characteristics and have the user profile modified accordingly (S119). Alternatively, the user can reject the recommended performance characteristics and retain the user profile without modification.

The performance characteristic of the vehicle control system can be automatically adjusted when the vehicle 10 is in the motive state. For example, the tightness of the steering control system 16 can be decreased at high speeds such that small operations of the steering wheel 19 do not result in overly drastic results. Accordingly, the performance characteristic can be variable based on the speed of the vehicle. Additionally, the user profile, as well as parameters thereof, can be selectable while the vehicle is in the motive state.

The performance characteristic of the vehicle control system can also be automatically adjusted based on a sensed condition, such as a width of the road, the slope of the road surface, the curvature of the road surface or whether the road is slippery from snow, ice or rain. Other conditions that can cause automatic adjustment of the performance characteristic include, but are not limited to, inclination of the vehicle (e.g., traveling up or down a steep road), the condition of the road surface (e.g., ice or rain), and the time of day (e.g., day or night). Sensors 61 connected to the controller 14 relay a sensed condition, such that the controller 14 automatically adjusts the performance characteristic of the vehicle control system accordingly. The sensed conditions can also be determined prior to the vehicle entering the motive state, such that the driver can decide whether or not to have the performance characteristic adjusted to account for the sensed condition. The road condition sensors 61 sense a road condition, and the vehicle control characteristic of the vehicle component control system can be readjusted based on the performance characteristic and the road condition.

The position of a driver's seat 63 can be sensed, such as with a position sensor, and the performance characteristic adjusted accordingly. A position of any vehicle device, such as the vehicle seat 63 or any vehicle component, such as the steering wheel 19, can be detected with a position sensor. The vehicle control characteristic of the vehicle component control system can be readjusted based on the performance'characteristic and the position of the vehicle device. For example, the position of the seat 63 affects the amount of travel the driver is able to impart to the brake pedal 20. Thus, the performance characteristic associated with the amount of brake travel can be adjusted based on the sensed seat position. Additionally, the calibration tests can be conducted with the driver in different seat positions to determine the effect of the seat position on the calibration test results. The driver can also save different user profiles associated with different seat positions, such that the driver can select the appropriate user profile based on the seat position being used. Alternatively, the system can prompt the driver to adjust vehicle components, such as the vehicle seat 63, the steering wheel 19, mirrors, etc., to attain optimum performance. The calibration tests can then be rerun with the positionally adjusted vehicle components.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "portion" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A method of customizing a vehicle component control system of a vehicle, comprising the steps of
    creating with a controller a user profile having at least one performance characteristic, the creating the user profile step including entering an adaptation mode including presenting a stimulus via a stimuli presentation system;
        detecting with an actuation sensor actuation of a vehicle component of the vehicle component control system in response to the stimulus; and
        determining with the controller the at least one performance characteristic based on the detected actuation;
    storing the user profile in a memory device; and
    adapting at least one vehicle control characteristic of the vehicle component control system based on the at least one performance characteristic of the user profile.

2. The method of customizing a vehicle component control system of a vehicle according to claim 1, wherein
    the adapting at least one vehicle control characteristic step includes determining with a controller whether a user profile has been created and adapting at least one vehicle control characteristic of the vehicle component control system based on the performance characteristics of a baseline profile in the absence of a user profile.

3. The method of customizing a vehicle component control system of a vehicle according to claim 1, wherein
    the vehicle component control system is at least one of a steering control system, a braking control system, an acceleration control system and a transmission control system.

4. The method of customizing a vehicle component control system of a vehicle according to claim 1, wherein
    the user profile includes a plurality of performance characteristics, and the adapting at least one vehicle control characteristic step includes adapting a plurality of vehicle control characteristics of the vehicle component control system.

5. The method of customizing a vehicle component control system of a vehicle according to claim 1, wherein
    the adapting at least one vehicle control characteristic step includes adapting at least one vehicle control characteristic of each of a plurality of vehicle component control systems.

6. The method of customizing a vehicle component control system of a vehicle according to claim 1, wherein
    the presenting the stimulus step, the detecting the actuation step and the determining the performance characteristic step are repeated to determine each of a plurality of performance characteristics of the user profile.

7. The method of customizing a vehicle component control system of a vehicle according to claim 1, wherein
    the adaptation mode is entered only when the vehicle is in a non-motive state.

8. The method of customizing a vehicle component control system of a vehicle according to claim 1, wherein
    the creating the user profile step includes presenting via a stimuli presentation system information representing a comparison of the at least one performance characteristic of the user profile to a corresponding performance characteristic of one of a baseline profile and an aggregated user profile.

9. The method of customizing a vehicle component control system of a vehicle according to claim 8, further comprising
    modifying with the controller the user profile based on input received from a user input device in response to the presenting of information representing the comparison step.

10. The method of customizing a vehicle component control system of a vehicle according to claim 8, further comprising
    determining with the controller whether an updated baseline profile is available, and updating the baseline profile with the updated baseline profile when available.

11. The method of customizing a vehicle component control system of a vehicle according to claim 1, wherein
    the performance characteristic is a strength characteristic, the determining the performance characteristic step includes determining a speed of actuation after the presenting the stimulus step, and the presenting the stimulus step includes presenting an instruction to actuate the vehicle component as hard as possible.

12. The method of customizing a vehicle component control system of a vehicle according to claim 1, wherein
    the performance characteristic is a reaction characteristic, the determining the performance characteristic step includes determining a time to actuation after the step of presenting the stimulus, and the presenting the stimulus step includes first presenting a first stimulus including an instruction to actuate the vehicle component as quickly as possible after a second stimulus, and then presenting the second stimulus.

13. The method of customizing a vehicle component control system of a vehicle according to claim 1, wherein
    the performance characteristic is a range of motion characteristic, the determining the performance characteristic step includes determining an amount of actuation after the step of presenting the stimulus, and the presenting the stimulus step includes presenting an instruction to actuate the vehicle component as far as possible.

14. The method of customizing a vehicle component control system of a vehicle according to claim 1, further comprising
    detecting with a road condition sensor a road condition, and readjusting the vehicle control characteristic of the vehicle component control system based on the performance characteristic and the road condition.

15. The method of customizing a vehicle component control system of a vehicle according to claim 1, further comprising
detecting with a speed sensor a speed of the vehicle, and readjusting the vehicle control characteristic of the vehicle component control system based on the performance characteristic and the speed.

16. The method of customizing a vehicle component control system of a vehicle according to claim 15, wherein
the adapting at least one vehicle control characteristic step includes adjusting a movability of the vehicle component.

17. The method of customizing a vehicle component control system of a vehicle according to claim 16, wherein
the adjusting the movability step includes adjusting a resistance of the vehicle component.

18. The method of customizing a vehicle component control system of a vehicle according to claim 1, wherein
the adapting at least one vehicle control characteristic step includes adjusting a response to a signal from the vehicle component.

19. A method of customizing a vehicle component control system of a vehicle, comprising the steps of
creating with a controller a user profile having at least one performance characteristic;
storing the user profile in a memory device;
adapting at least one vehicle control characteristic of the vehicle component control system based on the at least one performance characteristic of the user profile; and
monitoring with the controller actuation of a vehicle component of the vehicle component control system while the vehicle is in a motive state, determining whether the actuation of the vehicle component deviates from an expected actuation, and presenting information representing deviation from the expected actuation.

20. The method of customizing a vehicle component control system of a vehicle according to claim 19, further comprising
modifying with the controller the user profile based on input received from a user input device in response to the presenting information representing deviation from the expected actuation step.

21. A method of customizing a vehicle component control system of a vehicle, comprising the steps of
creating with a controller a user profile having an entropy characteristic;
determining the entropy characteristic, the determining the entropy characteristic step including
presenting a stimulus via a stimuli presentation system, the presenting the stimulus step including displaying a representation of the vehicle with a plurality of boundary markings and a movement of the representation of the vehicle relative to the boundary markings;
detecting actuation of the vehicle component corresponding to the movement of the representation of the vehicle; and
determining a corresponding actuation after the presenting the stimulus step;
storing the user profile in a memory device; and
adapting at least one vehicle control characteristic of the vehicle component control system based on the entropy characteristic of the user profile.

\* \* \* \* \*